United States Patent
Fakharzadeh

(10) Patent No.: US 7,337,460 B1
(45) Date of Patent: Feb. 26, 2008

(54) COMBINING PROCESS FOR USE IN SENDING TRICK-MODE VIDEO STREAMS WITH A HIGH PERFORMANCE

(75) Inventor: Jahan Shah Fakharzadeh, Park City, UT (US)

(73) Assignee: Unisys Corporation, Blue Bell, PA (US)

( * ) Notice: Subject to any disclaimer, the term of this patent is extended or adjusted under 35 U.S.C. 154(b) by 1477 days.

(21) Appl. No.: 10/140,656

(22) Filed: May 7, 2002

(51) Int. Cl.
*H04N 7/173* (2006.01)

(52) U.S. Cl. .......................... 725/90; 386/33; 386/68; 386/111; 386/112

(58) Field of Classification Search ............... 386/6, 386/7, 8, 33, 111, 112, 68; 725/89, 90
See application file for complete search history.

(56) References Cited

U.S. PATENT DOCUMENTS 5,659,539 A * 8/1997 Porter et al. .............. 709/231
6,389,218 B2 * 5/2002 Gordon et al. ............. 386/68
6,510,554 B1 * 1/2003 Gordon et al. ............. 725/90
2001/0026677 A1 * 10/2001 Chen et al. ................ 386/68

* cited by examiner

Primary Examiner—Chris Kelley
Assistant Examiner—Sahar A. Baig
(74) Attorney, Agent, or Firm—Charles A. Johnson; Robert Marley; Charles Fassbender

(57) ABSTRACT

A high-performance combining process has use in sending a trick-mode video stream, of a particular video, from a video server to a viewer network. This combining process—1) sends a series of spaced-apart requests to a computer, with each request being for combining directions which indicate how to generate a respective portion of the trick-mode video stream by combining video data that was previously stored in memory before the sending step with selected items that are generated in the computer in response to the sending step; 2) receives the requested combining directions; and 3) uses the directions to combine the selected items with the video data that was previously stored in the memory.

11 Claims, 9 Drawing Sheets

SA6-1 → STORE STARTING ADDRESS AND LENGTH OF VIDEO SEGMENTS IN MEMORY 30b THAT INCLUDE SELECTED PICTURES FOR TRICK-MODE STREAM

SA6-2 → EG - "I-PICTURES"

SA6-3 → STORE LOCATION OF ITEMS TO ALTER IN SA6-1

SA6-4 → EG - PES PACKET PRESENTATION TIME STAMPS

SA6-5 → EG - PES PACKET DECODING TIME STAMPS

SA6-6 → EG - TRANSPORT PACKET PROGRAM CLOCK REFERENCES

SA6-7 → EG - PICTURE HEADER TEMPORAL REFERENCES

SA6-8 → EG - PICTURE HEADER VBV DELAYS

SA6-9 → EG - PICTURE CODING EXTENSION REPEAT FIELD FIRST FLAG

SA6-10 → STORE CHARACTERISTICS OF SELECTED PARTS IN SA6-1

SA6-11 → EG - STARTING TRANSPORT PACKET CONTINUITY COUNTER

SA6-12 → EG - ENDING TRANSPORT PACKET CONTINUITY COUNTER

SA6-13 → EG - ORIGINAL VALUE OF ITEMS IN SA6-4 THRU SA6-9

SA7-1 → GENERATE AND STORE PREDETERMINED VIDEO SEQUENCES

SA7-2 → EG - P-PICTURE WHICH RETAINS CURRENT PICTURE

SA7-3 → EG - B-PICTURE WHICH RETAINS CURRENT PICTURE

SA7-4 → EG - SAMPLE BRIDGE SEGMENT

SA7-5 → STORE LOCATIONS OF ITEMS TO ALTER IN SA7-1

SA7-6 → EG - SAME AS SA6-4 THRU SA6-9.

|  | C1 ↓ DESCRIPTION | C2 ↓ VIDEO | C3 ↓ CONTROL | C4 ↓ VIDEO | C5 ↓ CONTROL |
|---|---|---|---|---|---|
| R1 → | I - PICTURE | 49820 | 0 | 0 | 12 |
| R2 → | - MODIFY PCR | 6 | 0 | 6 | 24 |
| R3 → | - MODIFY PTS/DTS | 10 | 0 | 10 | 24 |
| R4 → | - MODIFY PREFIX | 14 | 0 | 14 | 24 |
| R5 → | - MODIFY VBV | 2 | 0 | 2 | 24 |
| R6 → | - MODIFY TR | 2 | 0 | 2 | 24 |
| R7 → | - MODIFY SUFFIX | 20 | 0 | 20 | 24 |
| R8 → | BRIDGE SEG. | 1316 | 0 |  | 12 |
| R9 → | 1ST P-PICTURE | 4324 | 0 | 0 | 12 |
| R10 → | - MODIFY PCR | 6 | 0 | 6 | 24 |
| R11 → | - MODIFY PTS | 5 | 0 | 5 | 24 |
| R12 → | - MODIFY VBV | 2 | 0 | 2 | 24 |
| R13 → | - MODIFY TR | 2 | 0 | 2 | 24 |
| R14 → | BRIDGE SEG. | 1692 | 0 | 0 | 12 |
| R15 → | 2ND P-PICTURE | 3948 | 0 | 0 | 12 |
| R16 → | - MODIFY PTS | 5 | 0 | 5 | 24 |
| R17 → | - MODIFY VBV | 2 | 0 | 2 | 24 |
| R18 → | - MODIFY TR | 2 | 0 | 2 | 24 |
| R19 → | BRIDGE SEG. | 2068 | 0 | 0 | 12 |
| R20 → | 3RD P-PICTURE | 3572 | 0 | 0 | 12 |
| R21 → | - MODIFY PTS | 5 | 0 | 5 | 24 |
| R22 → | - MODIFY VBV | 2 | 0 | 2 | 24 |
| R23 → | - MODIFY TR | 2 | 0 | 2 | 24 |
| R24 → | WRITE TO MEM. | 66740 | 12 | 87 | 0 |
| R25 → |  | TOTAL #1 = 133579 |  | TOTAL #2 = 642 |  |

COMBINING PROCESS FOR USE IN SENDING TRICK-MODE VIDEO STREAMS WITH A HIGH PERFORMANCE

RELATED CASES

The present invention which is claimed herein and which is identified by the above docket number and title, is related to two other inventions that are identified as follows: 1. Ser. No. 10/140,713 entitled "MAPPING PROCESS FOR USE IN SENDING TRICK-MODE VIDEO STREAM WITH A HIGH PERFORMANCE"; and, 2. Ser. No. 10/140,685 entitled "DIRECTING PROCESS FOR USE IN SENDING TRICK-MODE VIDEO STREAMS WITH A HIGH PERFORMANCE". Separate patent applications on all of these inventions were filed concurrently on May 7, 2002. These patent applications have one common Detailed Description and different sets of claims.

BACKGROUND OF THE INVENTION

This invention relates to video-on-demand systems which send multiple streams of video data from a video server to respective viewers; and more particularly, this invention relates to processes for sending trick-mode video streams with a high performance from the video server.

In the prior art, one early video-on-demand system is described in U.S. Pat. No. 5,583,561 which is entitled "MULTI-CAST DIGITAL VIDEO DATA SERVER USING SYNCHRONIZATION GROUPS". An overview of this system is shown in FIG. 1 of patent '561. There, multiple video programs are stored in a video library 10 which is coupled to a video server 12; and, the video server 12 is coupled through a network interface circuit 18 to a plurality of video display devices 24 and 26 on a network 20.

To receive a particular video at a particular display device, a request is sent by a viewer via a telephone to the video server. In response to the viewer's request, the video server 12 retrieves the requested video from the video library 10. Thereafter, the retrieved video is sent as a stream of video data from the video server 12 thru the network interface circuit 18 to the viewer on the network 20 who requested to see it.

One method for sending the stream of video data from the video server 12 thru the network interface circuit 18 is disclosed in detail in the above-referenced patent '561. Also, alternative methods are disclosed in—1) pending patent application Ser. No. 09/318,987 which is entitled "SCALEABLE VIDEO SYSTEM HAVING SHARED CONTROL CIRCUITS FOR SENDING MULTIPLE VIDEO STREAMS TO RESPECTIVE SETS OF VIEWERS", 2) pending patent application Ser. No. 09/796,816 which is entitled "METHOD OF MOVING VIDEO DATA THRU A VIDEO-ON-DEMAND SYSTEM WHICH AVOIDS PAGING BY AN OPERATING SYSTEM", and 3) pending patent application Ser. No. 09/881,903 which is entitled "QUICK-START METHOD OF MOVING VIDEO DATA THRU A VIDEO-ON-DEMAND SYSTEM". The details in the above patent and patent applications are herein incorporated by reference.

All of the above patents and application focus on how to send a video stream to a viewing device at the video's normal viewing speed. By comparison, a trick-mode video stream is sent to a viewing device to show the video at a speed which is faster or slower than the normal viewing speed. For example, trick-mode video streams enable a video to be viewed in modes such as fast-forward, fast-reverse, slow-forward, slow-reverse, and freeze frame.

One method for generating a trick-mode video stream from a normal video stream that is stored in a memory within the video server (herein method #1) is as follows. Initially, the video server transfers selected spaced-apart portions of the normal video stream from the memory into a buffer. Next, the video server modifies various items in the selected pictures in the buffer, and new items are also added to the buffer. The video server repeats the above steps until the buffer is filled; and then, it writes the content of the buffer into the memory as a portion of the trick-mode video stream.

However, a major problem with the above method #1 is that it requires a very large amount of video data to be read from/written to the memory; and that in turn inherently limits the speed with which the method can be carried out. To illustrate this problem, consider now a specific example where the normal video stream is stored in the memory in a standard MPEG-2 video format.

With the MPEG-2 format, the normal video stream is comprised of a sequence of "I-Pictures", "P-Pictures", and "B-Pictures". I-Pictures are encoded independently to get compression without reference to other pictures. P-Pictures are encoded with respect to previous I-Pictures or P-Pictures to thereby get additional compression. B-Pictures are encoded with respect to previous and future I-Pictures or P-Pictures to get even more compression.

Typically, the entire sequence of the I-Pictures, P-Pictures, and B-Pictures are encoded in groups of twelve to fifteen pictures, with each group containing a single I-Picture. An example of one such group is B(0), B(1), I(2), B(3), B(4), P(5), B(6), B(7), P(8), B(9), B(10), P(11), B(12), P(13), P(14). In this group, the number in parenthesis indicates the picture display order, or "temporal reference".

In the normal MPEG-2 video stream, the pictures of each group are sent in an out-of-order series such as I(2), B(0), B(1), P(S), B(3), B(4), P(8), B(6), B(7), P(11), B(9), B(10), P(14), B(12), B(13). Also, each picture may be partitioned into several parts that are sent as separate transmission segments; and, each segment may include various additional items, such as timing data, control data, etc.

When a trick-mode video stream is generated from a normal MPEG-2 video stream by the above method #1, the following memory reads and memory writes must occur. Initially, selected I-Picture segments in the normal video stream are read from memory and are transferred into the buffer. Next, one or more of the above additional items in the I-Picture segments are modified in the buffer; and, new items are also added to the buffer. These steps are repeated until the buffer is full; and then, the buffer is written into the memory.

Suppose now that the average number of bytes in the video segments for one complete I-Picture is "NI"; the average number of bytes that are modified in one I-Picture segment is "NM"; and the average number of bytes that are added is "NA". Then, to perform the above steps, the total number of reads and writes on average is NI+NM+NA+NI+NA.

Some realistic average numerical values of NI, NM, and NA for a 4-megabit per second MPEG-2 video stream respectively are 50 KB, 100 B, and 20 KB. Thus, with these values, the total number of bytes that are read/written by the above method #1 is 140,100 bytes. This large number of reads and writes severely limits the overall performance of the video server because they must be performed over and over for as long as a single trick-mode video stream needs to be sent. Also, these reads and writes must be repeated for each different trick-mode video stream; and that greatly limits the maximum number of trick-mode video streams which can be sent concurrently to separate viewing devices.

Accordingly, a primary object of the present invention is to address and overcome the above problem.

BRIEF SUMMARY OF THE INVENTION

The present invention, which is claimed herein, is a high-performance combining process for use in sending a trick-mode video stream, of a particular video, from a video server to a viewer network. Preferably, the video server comprises a digital computer that is coupled to a semiconductor memory, and a network interface circuit which couples the computer to the viewer network; and, the combining process is performed by the network interface circuit.

Included in the combining process is the step of sending, to the computer, a series of spaced-apart requests, with each request being for combining directions. These combining directions indicate how to generate a respective portion of the trick-mode video stream by combining video data that was previously stored in the memory before the sending step with selected items that are generated in the computer in response to the sending step. After the network interface circuit receives the requesting combining directions, it uses them to combine the selected items with the video data that was previously stored in the memory. Then, the network interface circuit sends the result of the combining step to the viewer network as the respective portion of the trick-mode video stream.

In one preferred video server, the above combining process is executed in conjunction with a high-performance mapping process and a high-performance directing process. All three of these processes are described herein in the DETAILED DESCRIPTION, and the latter two processes are claimed in the two cases which are herein cited as "RELATED CASES".

In one particular operating mode, the mapping process is executed on the video while the video is being initially read into the video server from an external source. Thereafter, if the video server receives a request to send the video to a display device in a trick-mode, the computer in the video server executes the directing process while the network interface circuit in the video server executes the combining process.

The mapping process generates a trick-mode control map which identifies the type and location of the selected items that need to be built for the trick-mode video stream. The directing process builds those selected items in response to requests from the combining process, and sends combining directions back to the combining process. The combining process uses the combining directions to generate the trick-mode video stream and send it to a viewing device.

A major feature of the above combining process is that it enables the trick-mode video stream to be generated and sent by the video server with substantially fewer memory reads and memory writes than method #1. In one specific example that is described herein in detail in conjunction with FIG. 6, the total amount of data that is read from/written to a memory in the video server via the present invention is 642 bytes; whereas with method #1, the total amount of data that is read from/written to the memory is 133,579 bytes! Consequently, with the present invention, the maximum number of different trick-mode video streams which can be sent concurrently to separate viewing devices is greatly increased.

BRIEF DESCRIPTION OF THE DRAWINGS

FIG. 3 shows additional details regarding the high-performance trick-mode mapping process in FIG. 2.

FIG. 8 shows a chart which compares the performance of the FIG. 1 video server against the performance of a video server that generates trick-mode video streams by method #1 as described in the BACKGROUND OF THE INVENTION.

DETAILED DESCRIPTION

Figure 1:
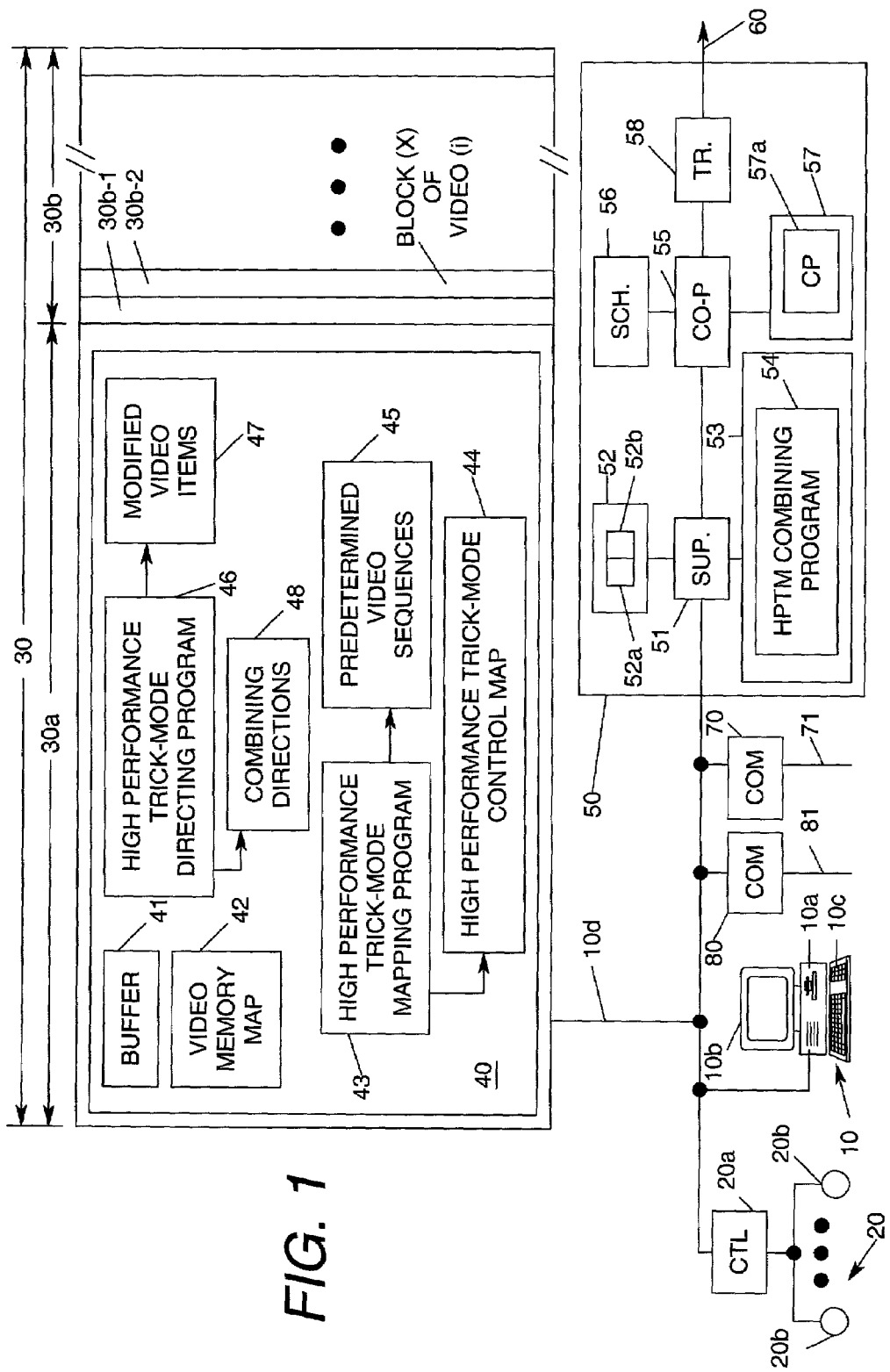
FIG. 1 shows one preferred embodiment of a video server which executes a high-performance trick-mode mapping process, a high performance trick-mode directing process, and a high-performance trick-mode combining process in accordance with the present invention.

One preferred embodiment of a video-on-demand system which generates and sends trick-mode video streams in accordance with the present invention is shown in FIG. 1. The major modules in this FIG. 1 system are modules 10, 20, 30, 40, 50, 60, 70 and 80. Each of these FIG. 1 modules is described immediately below.

Module 10 is a digital computer. It includes an instruction processor 10a, a visual monitor 10b, a keyboard 10c, and an I/O bus 10d. In one embodiment, the instruction processor 10a is a Pentium instruction processor from Intel Corp.

Module 20 is a disk storage module which includes a disk controller 20a and a set of disks 20b. The disks 20b can be magnetic storage-type disks or optical storage-type disks, as desired. The disks are read and written in response to commands that are sent to the disk controller 20a over the I/O bus 10d.

Module 30 is a random access semiconductor memory. This memory 30 is comprised of a multitude of storage cells that are selected by memory addresses. To read or write particular storage cells, commands with accompanying memory addresses are sent to the memory 30 on the I/O bus 10d.

Module 40 is a video server application program which is stored in section 30a of the memory 30. Seven major components within the program 40 are identified in FIG. 1 by reference numerals 41-47.

Component 41 is a temporary buffer for a video that is transferred from a remotely located video library through the buffer and into section 30b of the memory 30. Memory section 30b is subdivided into many blocks 30b-1 thru 30b-N, and each video that is transferred into the memory section 30b typically occupies several dozen of those blocks. The particular blocks in which a video is stored are selected in any order by the program 40; and, component 42 is a memory map which indicates where consecutive blocks of each video are stored.

Component 43 is a high-performance trick-mode mapping program which is executed by the computer 10. When this program 43 is executed, the computer 10 performs a high-performance trick-mode mapping process which produces components 44 and 45.

Component 44 is a high-performance trick-mode control map. This map identifies segments of a video in the memory section 30b that include selected spaced-apart pictures which are to be sent in a trick-mode video stream. Also, the map 44 includes the locations of various items within the selected segments that need to be modified for use in the trick-mode video stream, and the map 44 indicates the type of modifications that need to be made.

Component 45 is a selected number of predetermined video sequences for use in the trick-mode video stream. Each such sequence 45 is identified in the map 44, along with the locations and identity of items that need to be modified when the sequence is incorporated into a trick-mode video stream.

Component 46 is a high-performance trick-mode directing program which is executed by the computer 10. When this program 46 is executed, the computer 10 performs a high-performance trick-mode directing process which produces components 47 and 48.

Component 47 is the group of video items which are identified by the map 44 after those items have been modified according to the modifications that are indicated within the map 44. Thus, component 47 includes modified items from the predetermined video sequences 45, and component 47 includes modified items from the video segments in memory section 30b that contains the selected spaced-apart pictures.

Component 48 is a set of combining directions. These directions 48 specify how to generate a portion of the trick-mode video stream by combining the modified video items 47 with the predetermined video sequences 45 and the video segments in memory section 30b that contain the selected spaced-apart pictures.

Module 50 is a network interface circuit which includes components 51-58. Component 51 is a supervisor processor. Component 52 is a memory which includes a respective pair of data buffers 52a and 52b for each video stream that is to be sent. Component 53 is a control memory which stores a high-performance trick-mode combining program 54 that is executed by the supervisor processor 51.

Component 55 is a co-processor which has a scheduler circuit 56. Component 57 is a control memory which stores a control program CP that is executed by the co-processor 55. Component 58 is a transmitter that connects the co-processor 55 to a viewer network 60; and, that network is coupled to a respective video display device (not shown) for each viewer.

Module 70 is a communications module which receives various control messages from the viewers on the network 60. These control messages select particular videos, and they include VCR-like commands which control the selected video. Examples of the VCR-like commands are START, STOP, FAST-FORWARD, FAST-REVERSE, SLOW-FORWARD, SLOW-REVERSE, and FREEZE-FRAME. Each control message is received in module 70 over a communications channel 71; and, module 70 sends the control message on the I/O bus 10d to the mapping program 43.

Module 80 is another communications module, and it is coupled by a communications channel 81 to a remote video library. Each video that is selected by the above control messages initially comes from the video library. To selectively access a video from the video library as it is needed, the mapping program 43 sends request messages on the I/O bus 10d to module 81.

Each of the modules 10, 20, 30, 40, 50, 60, 70 and 80 in the FIG. 1 system have now been described, separately. Next, in order to start the description of how these FIG. 1 modules interact to generate and send trick-mode video streams in accordance with the present invention, reference should be made to FIG. 2.

Figure 2:
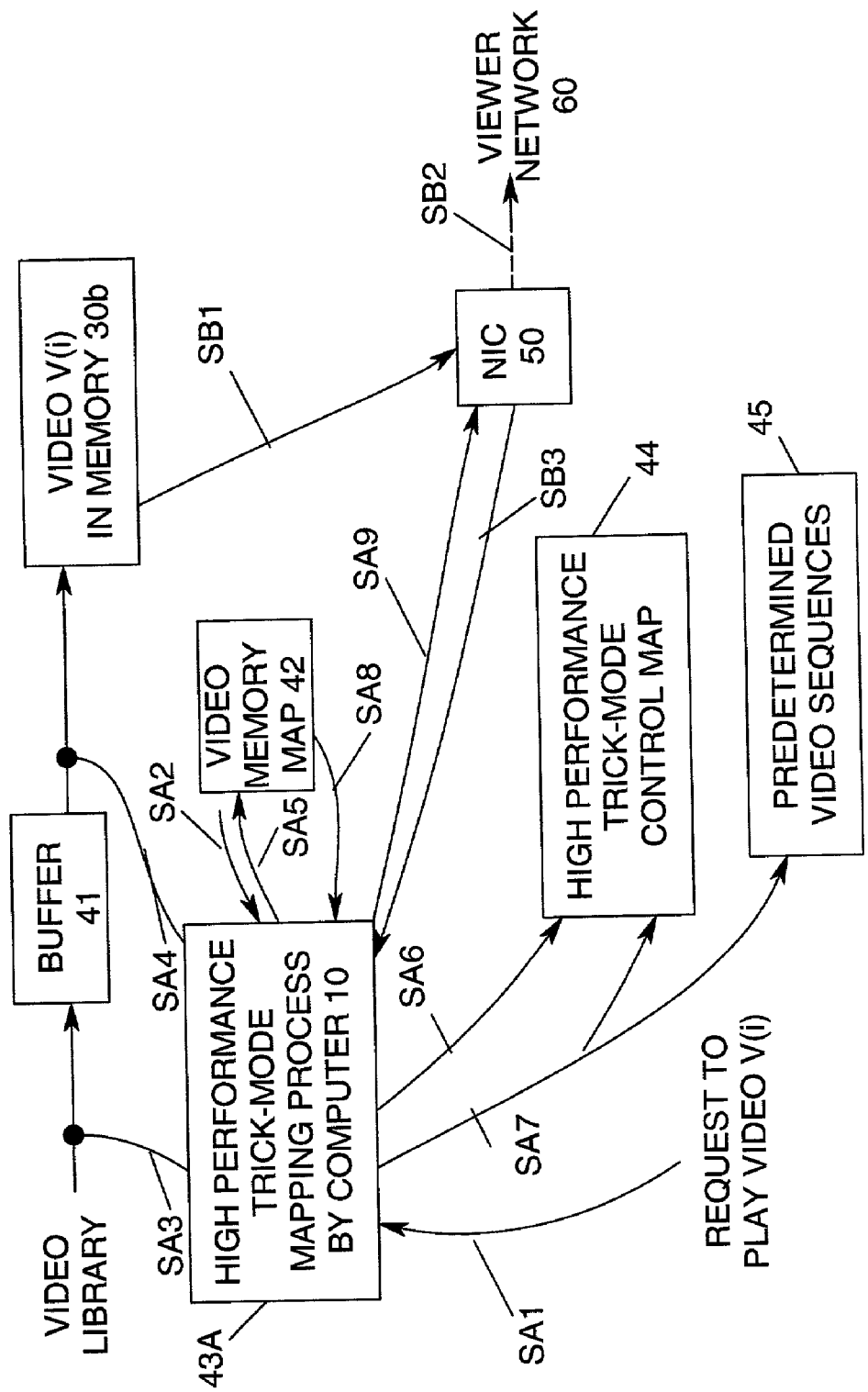
FIG. 2 shows the steps that are included in the high-performance trick-mode mapping process which the FIG. 1 video server executes.

FIG. 2 schematically illustrates a high-performance trick-mode process 43A which computer 10 performs when it executes the program 43 in FIG. 1. In this process 43A, the computer 10 performs steps SA1-SA9.

In step SA1 the computer 10 receives a request to send a video stream, to a particular display device D(x) on the network 60, which shows a selected video V(i) at normal play speed. This request travels over the communication channel 71 to the communication module 70, which in turn passes the request to the computer 10.

Next, in step SA2, the computer 10 checks the video memory map 42 to see if the requested video V(i) is already stored in memory section 30b. If it is not, then the computer 10 performs steps SA3-SA7. Otherwise, the computer 10 performs steps SA8-SA9.

In step SA3, the computer 10 sends a request to the remote video library for one block of the video V(i). This request travels through the communications module 80 and over the communication channel 81. Then in response to the request, the video library sends the requested block of the video V(i) in a predetermined format to the communications module 80 which in turn writes that block of the video V(i) into buffer 41.

Next, in step SA4, the computer 10 may change the format of the video block in buffer 41 to another format, as desired, that is tailored for transmission by the network interface circuit 50 as a normal video stream. Then the computer 10 moves the block of video from buffer 41 into a block of memory section 30b.

Next, in step SA5, the computer 10 updates the video memory map 42. This video memory map 42 correlates the blocks of each video, in their consecutive order for viewing in a normal viewing speed, to the respective starting addresses of the blocks in the memory section 30b.

Next, in step SA6, the computer 10 generates a portion of the high-performance trick-mode control map 44. This portion of the map identifies particular segments of the video block that was just moved to memory section 30b by step SA4. Those particular segments include selected spaced-apart pictures which are to be sent in a trick-mode video stream. Also, this portion of the map 44 includes—1) the locations of various items within the above particular segments that need to be modified for use in the trick-mode video stream, 2) an indication of the type of modifications that need to be made; and 3) certain characteristics of the selected pictures. Several specific examples of this step SA6 will be described shortly in conjunction with FIGS. 3 and 4.

Next, in step SA7, the computer 10 generates from 0-N predetermined video sequences 45 for use in the trick-mode video stream, where N is a selectable integer. Each such sequence 45 is identified in the map 44, along with the locations and identity of items that need to be modified within the sequence, when the sequence 45 is incorporated into a trick-mode video stream. Several specific examples of this step SA7 will also be described shortly in conjunction with FIGS. 3 and 4.

The above steps SA3-SA7 are repeated over and over by the computer 10 until the video V(i) has been transferred in its entirety into the memory section 30b. Also, after a predetermined number of blocks of the video V(i) have been transferred in the memory section 30b, the computer 10 concurrently performs steps SA8 and SA9.

In step SA8, the computer 10 examines the video memory map 42 to obtain the beginning addresses of the first two blocks of the video V(i) which are to be sent the display device D(x). Then in step SA9, the computer 10 sends the above two beginning addresses to the supervisor processor 51 in the network interface circuit 50.

When the supervisor processor 51 receives the above two beginning addresses, it uses them to fill the data buffers 52a and 52b with a portion of the video V(i) from memory section 30b. This occurs in FIG. 2 as step SB1. Then, from the data buffers 52a and 52b, video data is transferred by the co-processor 55 through the transmitter 58 to the display device D(x) on the network 60 in a time-shared fashion. This occurs in FIG. 2 as step SB2.

For each particular viewer, the scheduler circuit 56 allocates certain time-slots on the network 60. Then, when a time-slot for a particular viewer occurs, the co-processor 55 reads a predetermined number of bytes of the video V(i) from one of the data buffers 52a or 52b, and it sends them through the transmitter 58 to the display device D(x) on the network 60.

Initially, the co-processor 55 sends the video bytes from data buffer 52a through the transmitter 58 to the display device D(x). Thereafter, when all of the bytes in data buffer 52a have been sent, the co-processor 55 sends the video bytes from data buffer 52b; and at the same time, the supervisor processor 51 sends a message on the I/O bus 10d to the computer 10 which indicates that the above event occurred. This occurs in FIG. 2 as step SB3.

In response to the above message, the computer 10 again performs step SA8 wherein it examines the video memory map 42 and thereby determines which block in the memory section 30b stores the portion of the video V(i) that should be sent next. Then in step SA9, the computer 10 sends the beginning address of that next block to the supervisor processor 51.

Thereafter, the supervisor processor 51 again performs step SB1 wherein it uses the above beginning address that it just received to transfer the next block of the video V(i) from memory section 30b into data buffer 52a. This sequence of sending video bytes from one of the data buffers 52a or 52b while filling the other data buffer with video bytes that will be sent next continues over and over until program 43 sends a command to the supervisor processor 51 to stop the sequence.

Figure 4:
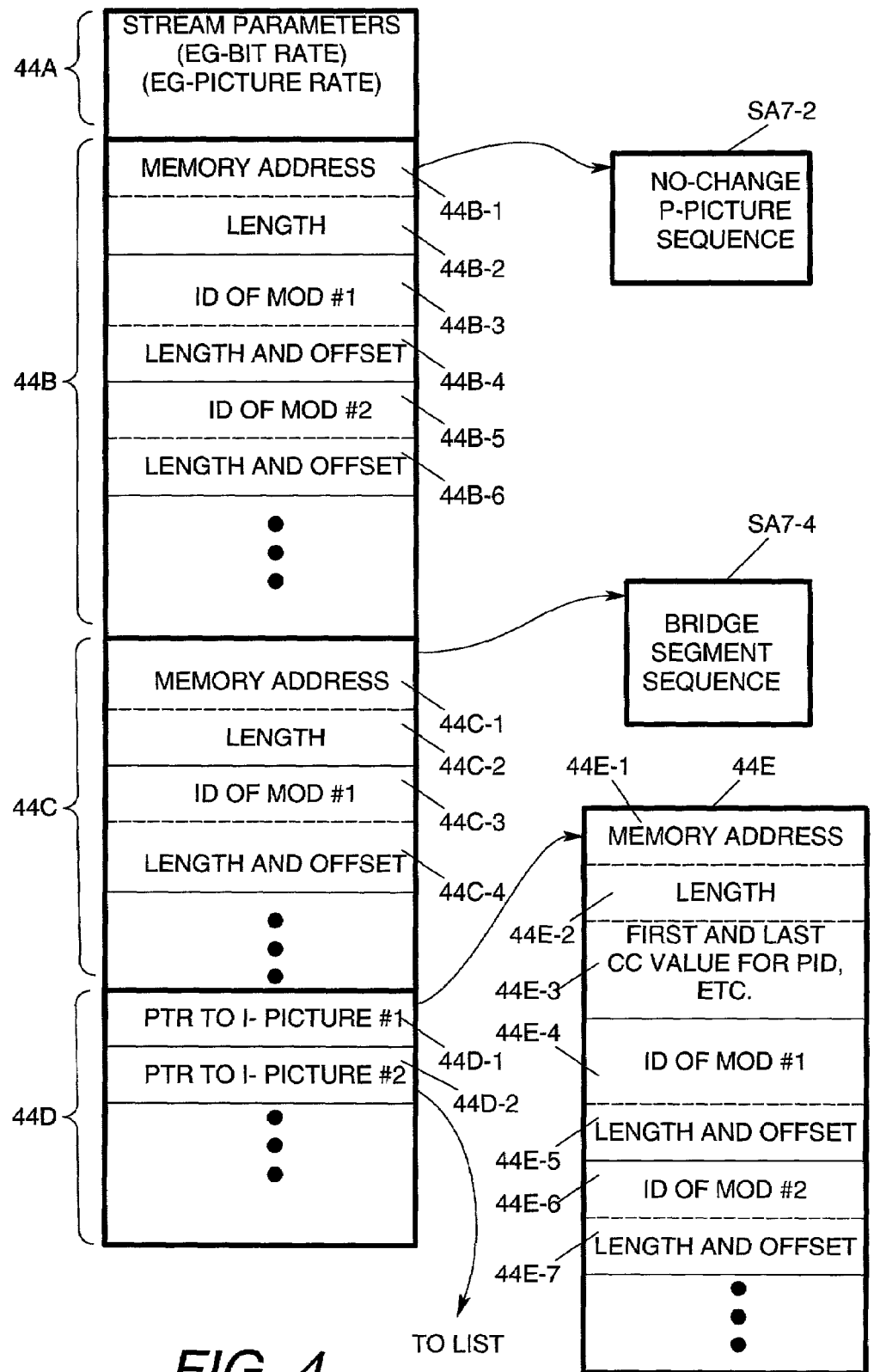
FIG. 4 shows an example of a trick-mode control map that is generated by the high-performance trick-mode mapping process in FIG. 2.

Turning now to FIGS. 3 and 4, additional details of steps SA6 and SA7 in FIG. 2 will be described. In FIG. 3, reference numeral SA6-1 indicates that in step SA6, the mapping process 43A identifies segments of the video V(i) in memory section 30b, which include selected pictures that are to be sent in the trick-mode video stream. This is achieved by storing the starting memory address and length of each such segment in the control map 44. For example, when the video V(i) in memory section 30b is in the MPEG-2 format, then step SA6 stores the starting memory address and length of each segment that includes an I-Picture; and, this is indicated in FIG. 3 by reference numeral SA6-2.

Next in FIG. 3, reference numeral SA6-3 indicates that by step SA6, the high-performance trick-mode control map 44 incorporates the locations of various items, within the video segments SA6-1, that need to be modified for use in the trick-mode video stream. These items include display sequence numbers, timing parameters, buffering parameters, interlacing parameters, transmission sequence numbers, clock references, time stamps, and null video data. When the video V(i) in memory section 30b is in the MPEG-2 format, then several specific examples of the above items that need to be modified are indicated by reference numerals SA6-4 thru SA6-9.

Item SA6-4 is a "PES PACKET PRESENTATION TIME STAMP". The letters "PES" stand for "Packetized Elementary Stream"; and, a single I, P, or B picture is transmitted on the network 60 in one or more PES packets. This item SA6-4 instructs a decoder in the display device on the network 60 when to display a picture such that the picture is synchronized with its sound.

Item SA6-5 is a "PES PACKET DECODING TIME STAMP". This item SA6-5 helps the decoder, in the display device on the network 60, to decide when to start decoding a picture that it has received and has internally stored in a buffer.

Item SA6-6 is a "TRANSPORT PACKET PROGRAM CLOCK REFERENCE". This item SA6-6 provides data that synchronizes time in the video server with time in the display device on the network 60. Typically, this item SA6-6 is sent one to ten times per second.

Item SA6-7 is a "PICTURE HEADER TEMPORAL REFERENCE". When several pictures are encoded in a group, this item SA6-7 is a field in the header of each picture; and it indicates the order within the group in which the picture is to be displayed by the display device on the network 60.

Item SA6-8 is a "PICTURE HEADER VBV DELAY". This item SA6-8 is a field in the header of each picture to help the decoder, in the display device on the network 60, satisfy certain timing and buffering requirements which must be met to prevent buffer overflow and underflow.

Item SA6-9 is a "PICTURE CODING EXTENSION REPEAT-FIRST-FIEID FLAG". This item SA6-9 is a field in the picture coding extension header that is used when a picture is comprised of two interlaced fields. For example, a picture may be encoded as a top field and a bottom field, where each field contains alternating lines of the picture. Either the top field or the bottom field may be the first field to be displayed, as directed by other items in the picture coding extension header. If the field ordering differs between two consecutive pictures, one field may need to be repeated in order to maintain proper field alternation. This item SA6-9 indicates whether the first field of a picture is to be repeated.

Next in FIG. 3, reference numeral SA6-10 indicates that by step SA6, the high-performance trick-mode control map 44 also stores certain characteristics of various items within the video segments SA6-1. When the video V(i) in memory section 30b is in the MPEG-2 format, then several specific examples of these characteristics are indicated by reference numerals SA6-11 thru SA6-13.

Item SA6-11 is a "STARTING TRANSPORT PACKET CONTINUITY COUNTER", and item SA6-12 is an "END-ING TRANSPORT PACKET CONTINUITY COUNTER". In an MPEG-2 video stream, the "PES packets" are divided into "Transport Packets" of 188 bytes each; and, each transport packet contains a "CONTINUITY COUNTER". The CONTINUITY COUNTER counts the Transport Packets of a sequence, modulo sixteen.

Similarly, the original value of any of the items SA6-4 thru SA6-9 can be stored, as desired, in the high-performance trick-mode control map 44. This is indicated, in FIG. 3, by reference numeral SA6-13.

Next in FIG. 3, reference numeral SA7-1 indicates that step SA7 in the mapping process 43A generates and stores one or more of the predetermined video sequences 45 which are to be sent in the trick-mode video stream. Also, the beginning address of each predetermined video sequence is stored in the control map 44. When the video V(i) in memory section 30b is in the MPEG-2 format, then several specific examples of these predetermined video sequences 45 are indicated by reference numerals SA7-2 thru SA7-4.

The predetermined video sequence SA7-2 is a particular type of "P-Picture" which makes no change to the picture that is currently being displayed. Similarly, the predetermined video sequence SA7-3 is a particular type of "B-Picture" which makes no change to the picture that is currently being displayed.

The predetermined video sequence SA7-4 is a "SAMPLE BRIDGE SEGMENT". One or more of these bridge segments can be inserted into a trick-mode video stream to maintain the proper bit-rate and buffering that MPEG-2 requires for a display device to operate properly; and to maintain proper sequencing between Transport Packets which have respective CONTINUITY COUNTERS that are not consecutive.

Each predetermined video sequence SA7-1 which is generated and stored may include items that need to be modified before the predetermined video sequence is used in a trick-mode video stream. This is indicated in FIG. 3 by reference numeral SA7-5. Some specific examples of the items that may need to be modified in the predetermined video sequences SA7-1 are the same as the examples SA6-4 thru SA6-9 that were described above, and this is indicated by reference numeral SA7-6.

Next, with reference to FIG. 4, one preferred structure for the high-performance trick-mode control map 44 will be described. This control map 44 is built by steps SA6 and SA7 of FIG. 2.

In FIG. 4, the control map 44 includes four adjacent sections 44A, 44B, 44C, and 44D. Section 44A is a list of several basic parameters which apply to the video V(i). For example, these parameters include—1) the bit rate at which the video V(i) needs to be streamed on the viewer network 60; 2) the rate at which pictures need to be displayed by the display device on the network 60; etc.

Section 44B is a list of information that relates to the predetermined video sequence SA7-2 of FIG. 3. That video sequence SA7-2 is a P-Picture which makes no change to the picture that is currently being displayed.

Entry 44B-1 in the list 44B is the beginning address of the video sequence SA7-2 in the memory section 30a. Entry 44B-2 is the total number of bytes in the video sequence SA7-2.

Entry 44B-3 is the identity of a first modification that needs to be made in the video sequence SA7-2 when that sequence is used in a trick-mode video stream. This entry 44B-3 can identify any of the items SA6-4 thru SA6-9 in FIG. 3. The length of the item which needs to be modified, and its starting locations within the video sequence SA7-2, is provided by entry 44B-4.

Similarly, entry 44B-5 is the identity of a second modification that needs to be made in the video sequence SA7-2 when that sequence is used in a trick-mode video stream. This entry 44B-5 can identify any of the items SA6-4 thru SA6-9 in FIG. 3. The length of the item which needs to be modified, and its starting location within the video sequence SA7-2, is provided by entry 44B-6.

For each additional modification that needs to be made in the video sequence SA7-2, a pair of entries is provided which is similar to the above pair 44B-3 and 44B-4. This is indicated in the list 44B by the series of three dots.

Section 44C is a list of information that relates to the predetermined video sequence SA7-4 of FIG. 3. That video sequence SA7-4 is a bridge segment sequence.

Entry 44C-1 in the list 44C is the beginning address of the video sequence SA7-4 in the memory section 30a. Entry 44C-2 is the total number of bytes in the video sequence SA7-4.

Entry 44C-3 is the identity of a first modification that needs to be made in the video sequence SA7-4 when that sequence is used in a trick-mode video stream. This entry 44C-3 can identify the item SA6-6 in FIG. 3. The length of item SA6-6 which needs to be modified, and its starting location within the video sequence SA7-4, is provided by entry 44C-4.

For each additional modification that needs to be made in the video sequence SA7-4, a pair of entries is provided which is similar to the above pair 44C-3 and 44C-4. This is indicated in the list 44C by the series of three dots.

Section 44D is a list of pointers 44D-1, 44D-2, etc. Each of these pointers points to the beginning of a respective list; and, each list relates to a particular video segment in memory section 30b that includes one I-Picture in the video V(i). In FIG. 4, the pointer 44D-1 points to a list 44E that relates to the first I-Picture in the video V(i). Pointer 44D-2 points to a similar list (not shown) that relates to the second I-Picture in the video V(i); etc.

List 44E is comprised of several entries 44E-1, 44E-2, etc. Entry 44E-1 is the address in memory section 30b of the beginning of the video segment that contains the first I-Picture in the video V(i). Entry 44E-2 is the total number bytes in the above video segment which starts at address 44E-1.

Entry 44E-3 is a group of particular characteristics of the video segment which starts at address 44E-1. For example, entry 44E-3 is the starting value and ending value of the transport packet continuity counter for the video segment that starts at address 44E-1. This continuity counter was previously described as items SA6-11 and SA6-12 in FIG. 3.

Entry 44E-4 is the identity of a first modification that needs to be made, in the video segment that starts at address 44E-1, when that video segment is used in a trick-mode video stream. This entry 44E-4 can identify any of the items SA6-4 thru SA6-9 in FIG. 3. The length of the item which needs to be modified, and its starting location within the above video segment, is provided by entry 44E-5.

Similarly, entry 44E-6 is the identity of a second modification that needs to be made, in the video segment that starts at address 44E-1, when that video segment is used in a trick-mode video stream. This entry 44E-6 can identify any of the items SA6-4 thru SA6-9 in FIG. 3. The length of the item which needs to be modified, and its starting locations within the above video sequence, is provided by entry 44E-7.

For each additional modification that needs to be made in the video segment that starts at address 44E-1, a pair of entries is provided which is similar to the above pair 44E-4 and 44E-5. This is indicated in the list 44E by the series of three dots.

All of the parts of the high-performance trick-mode control map of FIG. 4 have now been described. Next, in order to describe the processes which use that control map to send a trick-mode video stream, reference should be made to FIG. 5.

Figure 5:
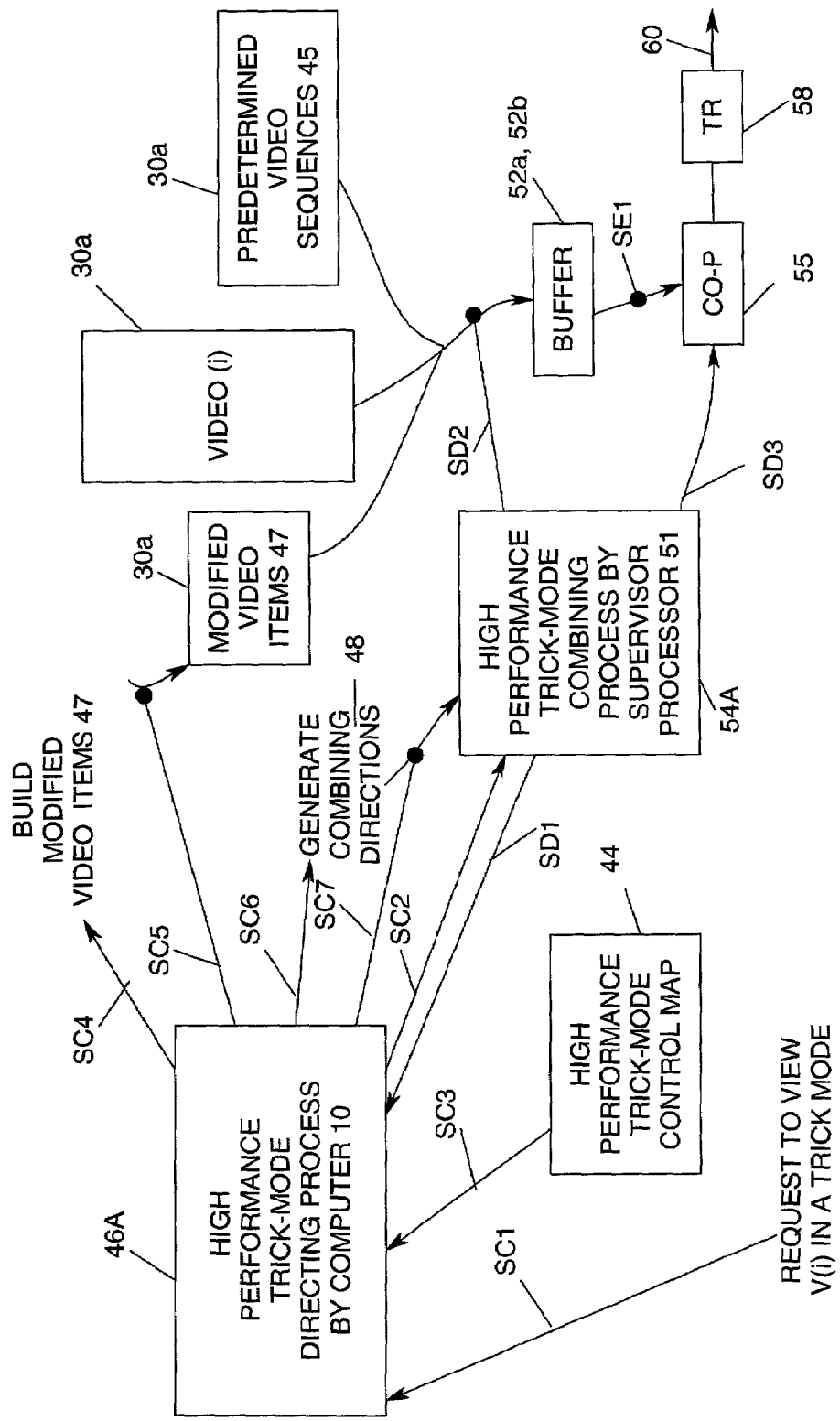
FIG. 5 shows the steps that are included in the high-performance trick-mode directing process, and the high-performance trick-mode combining process, which the FIG. 1 video server executes.

FIG. 5 schematically illustrates a high-performance trick-mode directing process 46A which the computer 10 performs when it executes the program 46 in FIG. 1. In this process 46A, the computer 10 performs steps SC1-SC7.

In addition, FIG. 5 schematically illustrates a high-performance trick-mode combining process 54A which the supervisor processor 51 performs when it executes the program 54 in FIG. 1. In this process 54A, the supervisor processor 51 performs steps SD1-SD3.

In step SC1, the computer 10 receives a request, from a particular viewer on the network 60, to send the video V(i) to the viewer's display device D(x) in a trick-mode such as fast-forward, fast-reverse, etc. This request travels to the computer 10 over the communication channel 71 in FIG. 1.

Next, in response to the above request, the computer 10 performs step SC2 wherein it sends a message to the supervisor processor 51 to stop performing the previously described steps SB1-SB3 of FIG. 2. By those steps, the video V(i) was being sent, at normal viewing speed, to the display device D(x).

When the supervisor processor 51 receives the above message, it stops performing steps SB1-SB3; and, it sends a response message back to the computer 10. This occurs as step SD1 in FIG. 5. The response message tells the computer 10 the address, in memory 30b, of where the stream to the display device D(x) stopped.

Next, in step SC3, the computer 10 reads one particular pointer from section 44D of the FIG. 4 control map. That particular pointer points to the respective list which is for the last I-Picture that was sent to the display device D(x). Then the computer 10 uses the above pointer to read entries from the respective list.

Next, in step SC4, the computer 10 uses the entries that it reads from the above list to build several modified video items 47 for the requested trick mode video stream. Some specific examples of these modified video items were previously described in conjunction with FIG. 3 as items SA6-4 thru SA6-9.

Each item which needs to be modified is identified and located by a pair of entries in the above list, such as the entries 44E-4 and 44E-5 in the list 44E of FIG. 4. After these modified items are built by the computer 10, they are stored by step SC5 in memory section 30a.

Next, in step SC6, the computer 10 generates combining directions 48 for the supervisor processor 51. These combining directions tell the supervisor processor 51 how to produce a portion of the requested trick-mode video stream by combining three different types of things which are: 1) the segment of video V(i) in memory section 30b which contains an I-Picture and which is pointed to by the pointer that is read in step SC3, 2) the modified video items 47 that were built by step SC4, and 3) the predetermined video sequences 45 that were built by step SA7. Then, in step SC7, these combining directions 48 are sent by the computer 10 to the supervisor processor 51.

Next, in response to the above step SC7, the supervisor processor 51 performs step SD2. There, the supervisor processor 51 follows the combining directions 48 to construct a portion of the requested trick-mode video stream; and, it stores that constructed portion in the pair of buffers 52a-52b.

When buffer 52a first gets filled with the constructed portion of the trick-mode video stream, the supervisor processor 51 performs step SD3 wherein it sends a control message to the co-processor 55. That message tells the co-processor 55 to start sending the requested trick-mode video stream thru the transmitter 58 to the display device D(x) on the network 60.

In response to the above control message, the co-processor 55 performs step SE1 wherein it alternately uses the pair of buffers 52a-52b as the source of the trick-mode video stream, beginning with buffer 52a. Also, each time any one of the buffers 52a-52b needs to be filled with the next portion of the trick-mode video stream, the supervisor processor 51 sends a message to the computer 10; and to fill that buffer, the computer 10 again performs the above described steps SC3-SC7.

Next, one preferred structure for the combining directions 48 will be described in detail in conjunction with FIGS. 6 and 7. These combining directions are generated by step SC6 of FIG. 5.

Figure 6:
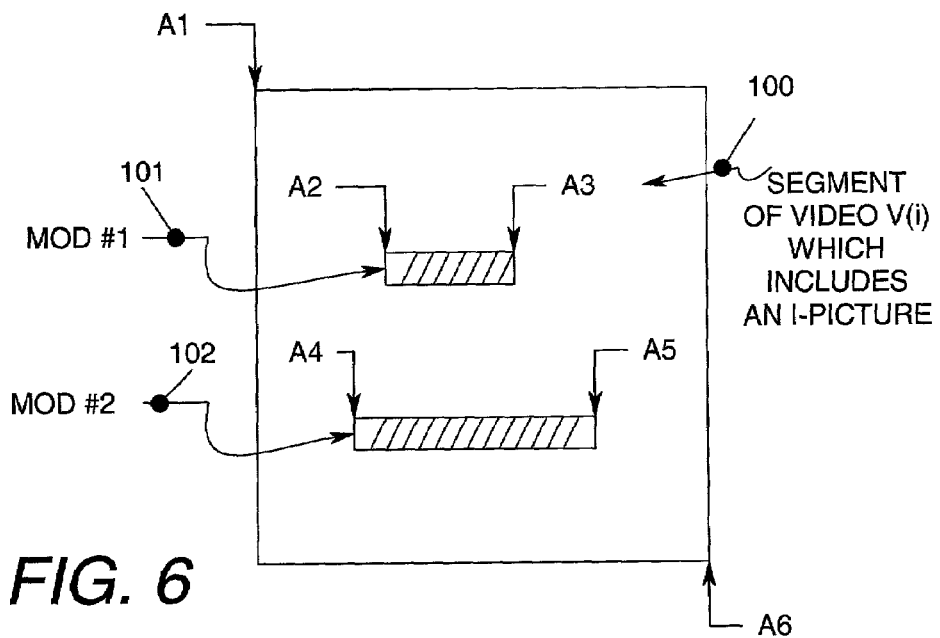
FIG. 6 shows one example of a segment of a video V(i) to which certain modifications need to be made before the video segment can be incorporated into a trick-mode video stream.

In FIG. 6, reference numeral 100 identifies a segment of the video V(i), in the memory section 30b, which contains an I-Picture. The starting address of the video segment 100, in memory section 30b is A1, and the ending address of the video segment 100 in memory section 30b is A6.

Within the video segment 100, two items 101 and 102 need to be modified in order for that segment to be incorporated into a trick-mode video stream. In memory section 30b, item 101 has a starting memory address A2, and an ending memory address A3. Also in memory section 30b, item 102 has a starting memory address A4 and an ending memory address A5. These items 101 and 102 can be any of items SA6-4 thru SA6-9 in FIG. 3 which were previously described.

Figure 7:
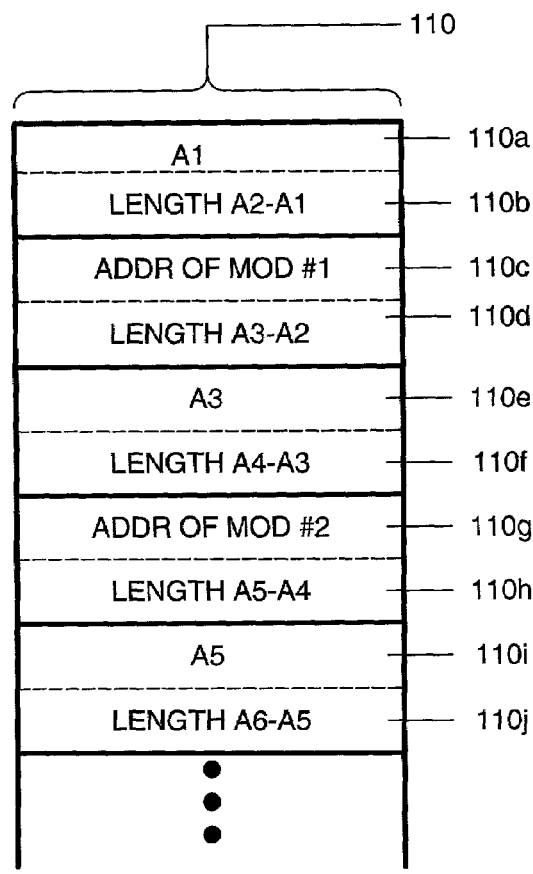
FIG. 7 shows a list of combining directions which specify how the FIG. 6 video segment needs to be modified and which is generated when the FIG. 1 video server executes the high performance trick-mode directing process.

Now, in FIG. 7, the combining directions which are generated for the above video segment and its two modifications are indicated by reference numeral 110. These combining directions are generated by step SC6 of FIG. 5, and they are in the form of list which includes entries 110a thru 110j.

Entry 110a is the address A1 of where the video segment 100 begins in memory section 30b. Entry 110b is number of bytes in the video segment 100 which can be sent in the trick-mode video stream before the first modification 101 needs to be made.

Entry 110c is the starting address of where the first modification 101 is stored in the memory section 30a. This modification 101 was generated by step SC4 in FIG. 5 and stored by step SC5. Entry 110d is the number of bytes that are in the first modification 101.

Entry 110e is the address, in memory section 30b, of where the video segment 100 continues after the first modification 101 occurs. Entry 110f is the number of bytes in the video segment 100 which occur between the end of the first modification 101 and the start of the second modification 102.

Entry 110g is the starting address of where the second modification 102 is stored in the memory section 30a. Here again, this modification 102 was generated by step SC4 in FIG. 5 and stored by step SC5. Entry 110h is the number of bytes that are in the second modification 102.

Entry 110i in the address, in memory section 30b, of where the video segment 100 continues after the second modification 102 occurs. Entry 110j is the number of bytes in the video segment 100 which occur between the end of the second modification 102 and the end of the video segment 100.

With the above combing directions 110, the supervisor processor 51 generates the trick-mode video stream in step SD2 of FIG. 5 simply by reading pieces of the video segment 100 from memory 30b and concatenating them with modified video items from memory section 30a. That concatenated result is stored by step SD2 in the buffers 52a-52b.

Throughout the above description of FIGS. 6 and 7, reference numeral 100 identified a segment of the video V(i) in the memory section 30b which contained an I-Picture. However, reference numeral 100 can also identify one of the predetermined video sequences 45 that are shown in FIG. 5. In that case, the modifications 101 and 102 of FIG. 6, and the list 110 of FIG. 7, would apply to the predetermined video sequence 45.

Next, with reference to FIG. 8, a comparison will be made between the performance of the video server of FIG. 1, and a video server which generates a trick-mode video stream in accordance with "method #1" that was described in the BACKGROUND OF THE INVENTION. To make the comparison, a representative portion of a trick-mode video stream will now be analyzed. This portion of the trick-mode video stream is shown in FIG. 8 in column C1.

The major parts of the column C1 video stream portion are identified in rows R1, R8, R9, R14, R15, R19 and R20. These parts follow each other in a series when the column C1 video stream portion is transmitted to a viewing device. However, before that transmission can occur, several of the above major parts need to be modified; and those modifications are identified in column C1 in rows R2-R7, R10-R13, R16-R18, and R21-R23.

For example, row R1 of column C1 indicates that the trick-mode video stream begins with a segment of the video V(i) which contains an I-Picture. Then rows R2-R7 identify the modifications that need to be made to the above I-Picture video segment before it can be transmitted in the trick-mode video stream.

Similarly, rows R8-R9 of column C1 indicate that the above modified I-Picture video segment is followed by a bridge segment and a segment of the video V(i) which contains a P-Picture. Then rows R10-R13 of column C1 identify several modifications that need to be made to the above P-Picture video segment before it can be transmitted in the trick-mode video stream.

Note that some of the modifications in column C1 are abbreviated due to the limited space in the column; but each of those abbreviations have the following meaning. PCR means PROGRAM CLOCK REFERENCE, and this is item SA6-6 in FIG. 3. PTS means PRESENTATION TIME STAMP, and this is item SA6-4 in FIG. 3. DTS means DECODING TIME STAMP, and this is item SA6-5 in FIG. 3. VBV means PICTURE HEADER VBV DELAY, and this is item SA6-8 in FIG. 3. TR means PICTURE HEADER TEMPORAL REFERENCE, and this is item SA6-7 in FIG. 3. PREFIX means any data in a transport packet that precedes the start of an I-Picture, and which needs to be overwritten because it is not part of the I-Picture data. SUFFIX means any data in a transport packet that follows the end of the I-Picture, and which needs to be overwritten because it is not part of the I-Picture data.

Considering now column C2 of FIG. 8, it lists representative lengths (in bytes) for all of the entries that are in rows R1-R24 of column C1. For example, row R1 of column C2 indicates that a representative length for a segment of the video V(i) which contains an I-Picture in 49,820 bytes. Similarly row R2 of column C1 indicates that a representative length of the transport packet program clock reference (PCR) is six bytes.

Now, in "method #1" that was described in the BACKGROUND OF THE INVENTION, all of the major parts in the column C1 video stream are read from the video V(i) in memory section 30b and stored in a buffer where they can be modified. The total number of bytes in this read operation is obtained by adding the number from column C2 that occur in rows R1, R8, R9, R14, R15, R19 and R20. Next in "method #1", the actual modifications are written into the major parts that are in the buffer. The total number of bytes in this write operation is obtained by adding the numbers from column C2 that occur in rows R2-R7, R10-R13, R16-R18, and R21-R23.

Next in "method #1", all of the modified major parts are written from the buffer into memory section 30b. The total number of bytes in this write operation is shown in row R24 of column C2, and it is obtained by adding the numbers in rows R1, R8, R9, R14, R15, R19 and R20 of column C2. Then, to have the above modified parts sent to a display device D(x) as a portion of a trick-mode video stream, the video server needs to write a control message for the network interface circuit which indicates the starting address and length of the modified parts. If the starting address is eight bytes of the message and the length is four bytes, then the message is twelve bytes which is indicated by row R24 of column C3.

Thus, with method #1, the total number of bytes that are read and written is the sum of all of the numbers in rows R1-R24 of columns C2 and C3; and this total, which is 133,579 is shown as total #1 in FIG. 8. By comparison, with the video server of FIG. 1, the corresponding number of bytes that are read and written is only 642; and this is shown in FIG. 8 as total #2.

Total #1 is more then two-hundred times larger than total #2, and this is very significant. Since the video system of FIG. 1 has over two-hundred times fewer reads and writes to perform, the FIG. 1 system can generate trick-mode video streams for two-hundred times as many display devices before it reaches its maximum computing capacity!

How total #2 is derived will now be described by referring back to FIG. 5. There, each time the supervisor processor 51 requests another portion of the trick-mode video stream, the computer 10 performs steps SC3-SC7. If the portion which is requested is the portion that is shown in column C1 of FIG. 8, then—a) step SC4 of FIG. 5 will build the modified items that are listed in column C1 of FIG. 8; b) step SC5 will store the modified items in memory 30a; and c) step SC6 will generate combining directions for the supervisor processor 51.

Column C4 in FIG. 8 lists the number of bytes that are written by step SC4 of FIG. 5 to build each of the modified items. For example, row R2 of column C4 indicates that six bytes are written by step SC4 to build the modified program clock reference (PCR). After a modified item is built, it is stored in memory section 30a by step SC5. That is indicated by row R24 of column C4, which is the sum of the numbers in rows R2-R7, R10-R13, R16-R18, and R21-R23 of column C4.

Column C5 in FIG. 8 lists the number of bytes that are written by step SC5 of FIG. 5 to generate the combining direction for the supervisor processor 51. These combining directions have the structure that is shown in FIG. 7 and was described previously in conjunction with that figure.

For each major part that is listed in column C1 of FIG. 8, the combining directions of FIG. 7 include—1) the starting address of the part, and 2) the length to the first modification in the part. These are entries 110a and 110b in FIG. 7. Also, for each modification that is listed in column C1 of FIG. 8, the combining directions of FIG. 7 include—1) the starting address of the modification, 2) the length of the modification, 3) the starting address of where the major part continues after the modification, and 4) the length to the next modification. These are entries 110c, 110d, 110e, and 110f in FIG. 7.

Each address is eight bytes of the FIG. 7 combining directions, and each length is four bytes. Thus, to generate the combining directions, twelve bytes are written for each major part that is listed in column C1 of FIG. 8, and twenty-four bytes are written for each modification that is listed in column C1 of FIG. 8. This is shown in column C5. Then, adding all of the numbers in rows R1-R24 of columns C4 and C5 produces the total #2.

One preferred embodiment of a video-on-demand system which operates in accordance with the present invention has now been described in detail. In addition however, various modifications can be made to the above described particular embodiment without departing from the gist of the invention; and, some of those modifications will now be described.

Figure 9:
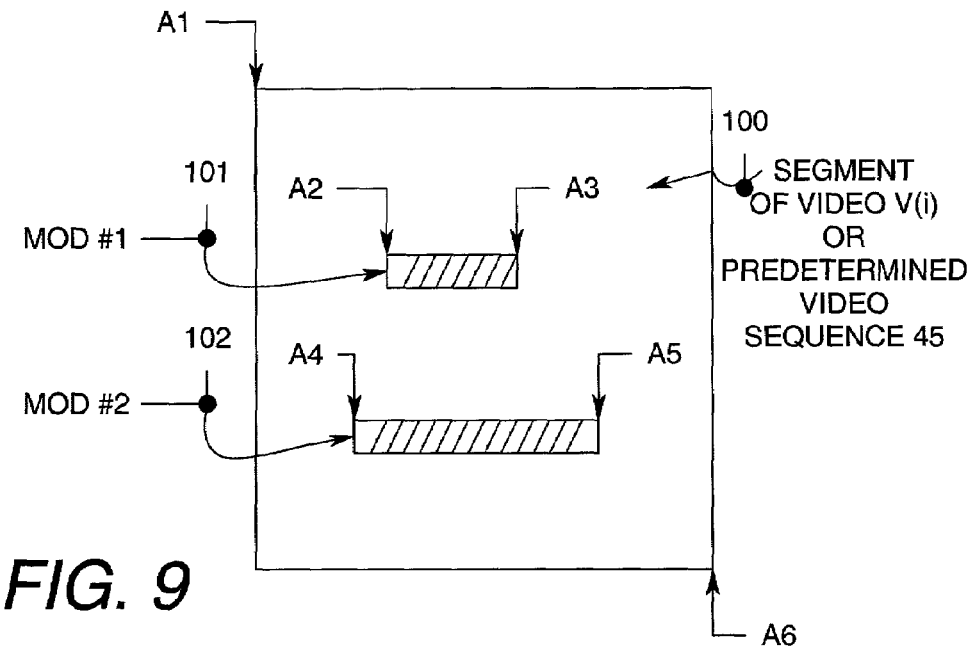
FIG. 9 shows the same video segment and modifications that are shown in FIG. 6 (for ease of reference with FIG. 10).
Figure 10:
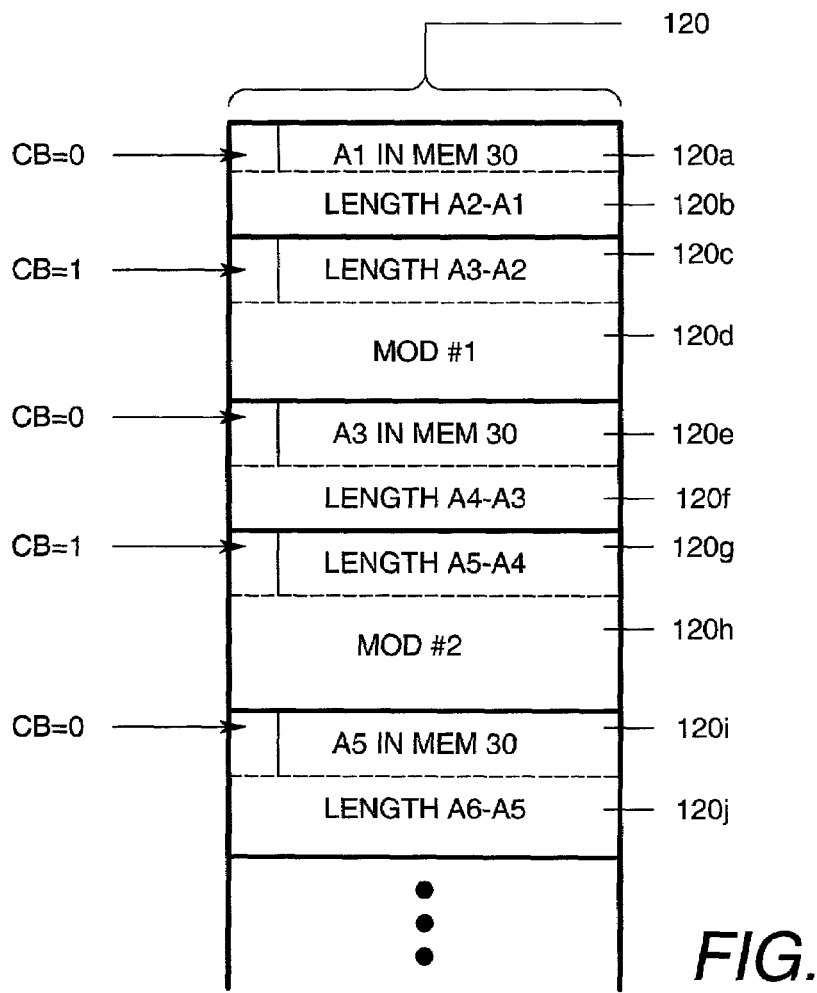
FIG. 10 shows one alternative list of combining directions which specify how the FIG. 9 video segment needs to be modified and which is generated when the FIG. 1 video server executes a second embodiment of the high performance trick-mode directing process.

A first modification is illustrated in FIGS. 9 and 10. With this modification, the combining directions 110 that were previously described in conjunction with FIGS. 6 and 7 are generated with a new structure.

Reference numeral 120 in FIG. 10 identifies the new combining directions. These combining directions 120 refer back to the video segment 100 of FIG. 6. For ease of reference, FIG. 6 is duplicated as FIG. 9, on the same page as FIG. 10.

The new combining directions 120 are in the form of a list which has entries 120a-120j. Entry 120a is the starting address of the video segment 100 in FIG. 9. That segment 100 can be a segment of the video V(i) in memory 30b or a predetermined video sequence 45 in memory section 30a.

Entry 120b is the number of bytes which occur between the start of the video segment 100 and the start of the first modification 101 which needs to be made in that video segment. Entry 120c is the length of the first modification 101; and, entry 120d is the actual first modification 101.

Entry 120e is the memory address of where the video segment 100 continues after the first modification 101. Entry 120f is the number of bytes that occur in the video segment 100 between the end of the first modification 101 and the start of the second modification 102.

Entry 120g is the length of the second modification 102. And, entry 120h is the actual second modification 102.

Entry 120i is the memory address of where the video segment 100 continues after the second modification 102. Entry 120j is the number of bytes that occur in the video segment 100 between the end of the second modification 102 and the end of the video segment 100.

Each of the entries 120a, 120c, 120e, 120g, and 120i also include a control bit "CB". An entry with CB=0 indicates— 1) that the remainder of the entry is a memory address of the start of, or continuation point in, the video segment 100; and 2) that the following entry is the number of bytes to the end of the segment or the start of a modification. An entry with CB=1 indicates—1) that the remainder of the entry is the length of a modification, and 2) that the actual modification follows immediately thereafter.

The combining directions 120 are generated by step SC6 of FIG. 5. Thus, steps SC4 and SC5 of FIG. 5 are eliminated because the modifications are generated as part of the combining directions by step SC6.

The combining directions 120 are sent to the high performance trick-mode combining process 54A by step SC7 of FIG. 5. Then in response, the supervisor processor 51 performs step SD2 of FIG. 5 wherein it follows the combining directions 120 to build a portion of the trick-mode video stream in the buffers 52a-52b.

Figure 11:
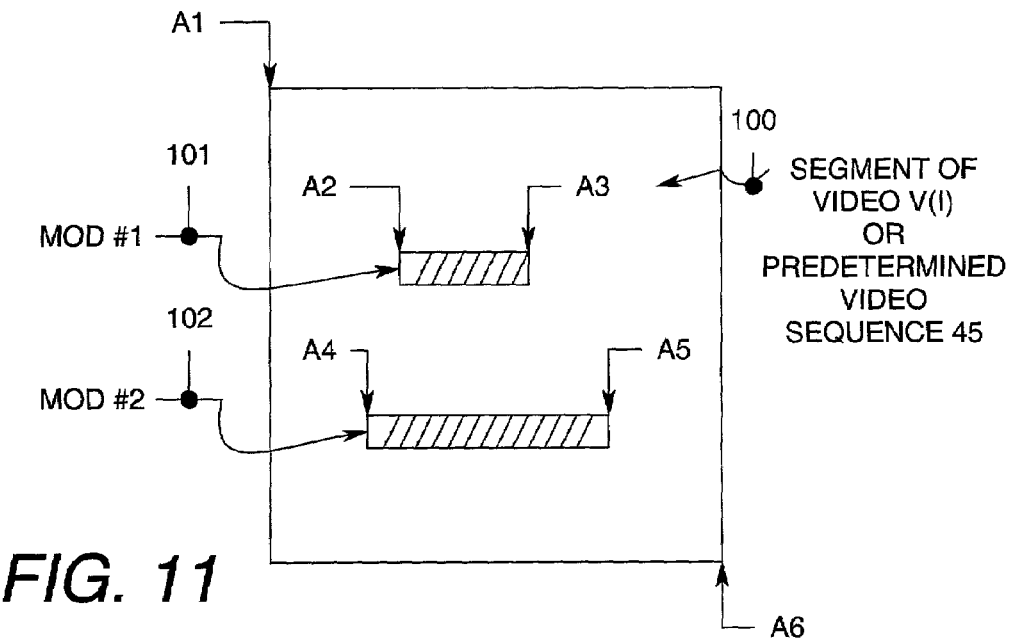
FIG. 11 shows the same video segment and modifications that are shown in FIG. 6 (for ease of reference with FIG. 12).
Figure 12:
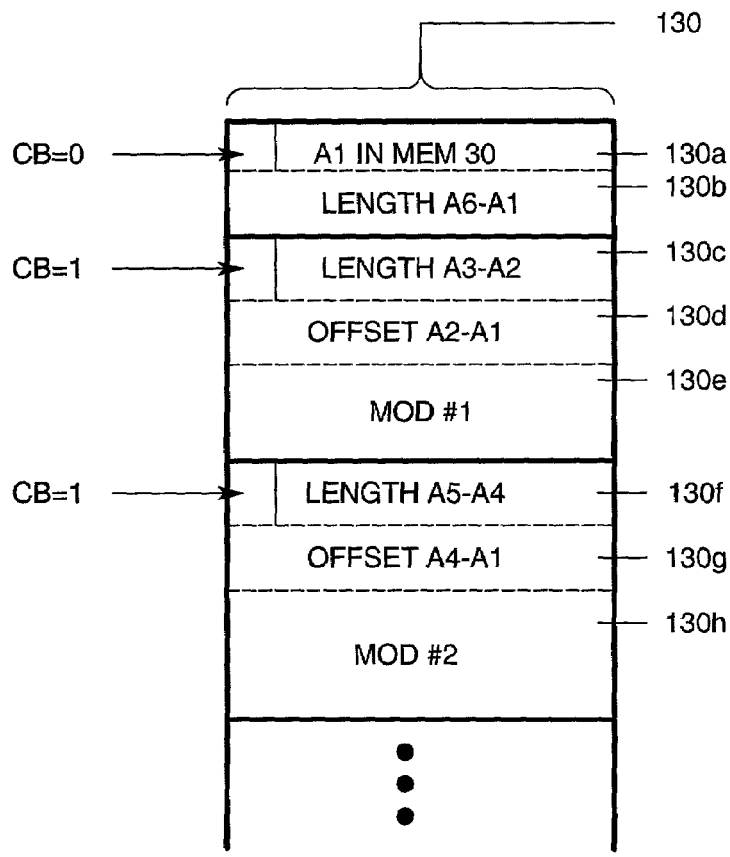
FIG. 12 shows another alternative list of combining directions which specify how the FIG. 11 video segment needs to be modified and which is generated when the FIG. 1 video server executes a third embodiment of the high performance trick-mode directing process.

Next, a second modification will be described in conjunction with FIGS. 11 and 12. By this modification, the combining directions 110 and 120 that were previously described are generated with still another new structure which is indicated by reference numeral 130 in FIG. 12. Here again, the combining directions 130 refer back to the video segment 100 of FIG. 6; and so for ease of reference, FIG. 6 is duplicated as FIG. 11 on the same page as FIG. 12.

The combining directions 130 are in the form of a list which has entries 130a-130h. Entry 130a is the starting memory address of the video segment 100 in FIG. 11; and, entry 130b is the total number of bytes in that video segment.

Entry 130c is the length of the first modification 101 which needs to be made to the video segment 100. Entry 130d is the number of bytes which occur between the start of the video segment 100 and the start of the first modification 101. Entry 130e is the actual first modification.

Similarly, entry 130f is the length of the second modification 102 which needs to be made to the video segment 100. Entry 130g is the number of bytes which occur between the start of the video segment 100 and the start of the second modification 102. Entry 130h is the actual second modification.

Each of the entries 130a, 130c, and 130f also include a control bit "CB". An entry with CB=0 indicates—1) that the remainder of the entry is a memory address of the start of the video segment 100; and 2) that the following entry is the length of the segment. An entry with CB−1 indicates—1) that the remainder of the entry is the length of a modification; 2) that the next entry is the offset from the start of the video segment to where the modification begins; and 3) that the actual modification follows immediately thereafter.

The combining directions 130 are generated by step SC6 of FIG. 5. Steps SC4 and SC5 of FIG. 5 are eliminated because the modifications 101 and 102 are part of the combining directions, which are generated by step SC6.

The combining directions 130 are sent to the high performance trick-mode combining process 54A by step SC7 of FIG. 5. Then in response, the supervisor processor 51 performs step SD2 of FIG. 5 wherein it follows the new combining directions 130 to build a portion of the trick-mode video stream in the buffers 52a-52b.

Next, a third modification and a fourth modification will be described with reference to FIG. 1. In that figure, the predetermined video sequences 45 and modified video items 47 are shown as being stored in memory section 30a as an integrated part of the video server application program 40. However, as a third modification, the predetermined video sequences 45 and/or the modified video items 47 can be stored in memory section 30b along with the video V(i).

Also in FIG. 1, the video server application program 40 is not shown as running under the control of an operating system program. However, as a fourth modification, an operating system program for the computer 10 can be stored in the memory 30; and, the video server application program 40 can be run under the control of that operating system together with any additional application programs in a time-shared fashion. With this modification, the memory section 30b preferably is "hidden" from the operating system; and the concept of a hidden memory section 30b is shown and described in detail in the pending patent application Ser. No. 09/796,816 which is referenced herein in the BACKGROUND OF THE INVENTION.

Next, a fifth modification will be described with reference to FIG. 2. In that figure, steps SA3-SA7 are repeated over and over by the computer 10 until the video V(i) has been transferred in its entirety into the memory section 30b. However, as a fifth modification, steps SA6 and SA7 are performed long before the computer 10 ever receives the request to play the video V(i) in step SA1.

One example of this fifth modification is that the computer 10 reads the video V(i) when that video is first stored on the remote video library. Then the computer 10 performs steps SA6 and SA7 wherein it generates the high-performance trick-mode control map 44 and builds the predetermined video sequences 45. Then the computer 10 stores the map 44 and video sequences 45 on one of the discs 20b in the FIG. 1 system for future use as needed.

Another example of this fifth modification is that a producer of the video V(i) generates and stores the map 44 and video sequences 45 in the remote video library along with the video V(i). Thereafter, when computer 10 receives the request to play the video V(i) as step SA1, the computer 10 simply reads the map 44 and video sequences 45 from the remote video library along with the video V(i).

Next, with reference to FIG. 2, a sixth modification will be described. In FIG. 2, step SA2 follows step SA1; step SA3 follows step SA2; etc. However, as a sixth modification, the order in which some of the FIG. 2 steps are performed can be changed. As one example, step SA7 can always be performed after step SA5 and before step SA6. As another example, step SA7 can be performed only once such that all of the predetermined video sequences are generated at the same time; and then, only steps SA3-SA6 are repeated over and over until the video V(i) has been transferred in its entirety into the memory section 30b.

Next, with reference to FIG. 8, a seventh modification will be described. In column C1 of FIG. 8, the major parts of one portion of a trick-mode video stream are identified in rows R1, R8, R9, R14, R15, R19 and R20; and, respective modifications to those major parts are identified in rows R2-R7, R10-R13, R16-R18, and R21-R23. In the complete trick-mode video stream, many portions which are similar to the portion in column C1 of FIG. 8 are concatenated together. For each such portion, row R1 references one particular I-Picture that is pointed to by the pointers in section 44D of the trick-mode control map of FIG. 4.

Suppose now that the video V(i) is to be displayed in a fast-forward viewing mode. In that case the I-Pictures which will be successively referenced by the rows R1 are I-Picture #S, I-Picture #S+k, I-Picture #S+2k, etc., where I-Picture #S is the picture at the start of the trick-mode video stream and k is a predetermined integer that is larger than one. Similarly, if the video V(i) is to be displayed in a fast-reverse viewing mode, then the I-Pictures which will be successively referenced by the rows R1 are I-Picture #S, I-Picture #S–k, I-Picture #S–2k, etc.

Now, suppose that the video V(i) is to be displayed in a slow-forward viewing mode. In that case, I-Picture #S which will be successively referenced by the rows R1 a total of k times; then I-Picture S+1 will be successively referenced by the rows R1 a total of k times; etc. Similarly, if the video V(i) is to be displayed in a slow-reverse viewing mode, then I-Pictures will be successively referenced by the rows R1 a total of k times; then Picture #S–1 will be successively referenced by the rows R1 a total of k times; etc. And, if the video V(i) is to be displayed in a freeze-frame viewing mode, then only Picture #S is successively referenced by the rows R1.

From section 44D of the FIG. 4 trick-mode control map, respective pointers to each of the I-Pictures are randomly accessible. This is because the pointer to I-Picture #S is a total of S–1 entries past the pointer to I-Picture #1; the pointer to I-Picture #S+k is S+k–1 entries past the pointer to I-Picture #1; etc. Also, as an alternative, the respective pointers in section 44D of the FIG. 4 control map can each be spaced-apart by a predetermined number of bytes, and they would still be randomly accessible.

Several modifications to the video-on-demand systems of FIGS. 1-8 have now been described. However, other modifications to the described details can also be made while still using the gist of the invention. Accordingly, it is to be understood that the present invention is not limited to just the above-described details of the preferred embodiment and modifications, but is defined by the appended claims.

What is claimed is:

1. A combining process for use in sending a trick-mode video stream from a video server which comprises—a) a digital computer that is coupled to a semiconductor memory which stores a video, and b) a network interface circuit which couples said computer to a viewer network; said process being performed by said network interface circuit and including the steps of:

sending, to said computer, a request for directions on how to generate a respective portion of said trick-mode video stream;

receiving from said computer, in response to said request, said directions in a form which identifies—a) a continuous segment of said video in said memory which includes—1) a picture, and 2) selected items that are spaced-apart within said continuous segment which need to be modified before being sent in said trick-mode video stream, and b) modified items, stored in a part of said memory separated from said continuous segment of said video, that correspond to said selected items with their modifications;

interleaving, within said network interface circuit in response to said directions, said modified items with all portions of said continuous segment of said video in said memory that are not said selected items; and, sending the result of said interleaving step to said viewer network as said respective portion of said trick-mode video stream.

2. A process according to claim 1 wherein said interleaving step includes the substep of reading each portion of said continuous segment of said video, that is not one of said selected items, from said memory at locations which are specified in said directions.

3. A process according to claim 2 wherein said network interface circuit reads each modified item, for said interleaving step, from said memory at locations that are specified in said directions.

4. A process according to claim 2 wherein said network interface circuit receives each modified item, for said interleaving step, as a portion of said directions.

5. A process according to claim 1 wherein said interleaving step includes the substep of reading each portion of said continuous segment of said video, that is not one of said selected items, from said memory at locations which said network interface circuit calculates from lengths and offsets that are specified in said directions.

6. A process according to claim 5 wherein said network interface circuit reads each modified item, for said interleaving step, from said memory at locations that are specified in said directions.

7. A process according to claim 5 wherein said network interface circuit receives each modified item, for said interleaving step, as a portion of said directions.

8. A process according to claim 1 wherein at least some of said selected items are items in the group of: display sequence numbers, timing parameters, buffering parameters, interlacing parameters, transmission sequence numbers, clock references, time stamps, and null video data.

9. A process according to claim 1 wherein said picture in said continuous segment is coded without reference to any other pictures.

10. A process according to claim 1 wherein said picture in said continuous segment is coded with reference to other pictures.

11. A process according to claim 1 wherein said trick-node video stream is selected from the group of a fast-forward video stream, a fast-reverse video stream, a slow-forward video stream, a slow-reverse video stream, and a freeze-frame video stream.

* * * * *

UNITED STATES PATENT AND TRADEMARK OFFICE
CERTIFICATE OF CORRECTION

PATENT NO. : 7,337,460 B1  Page 1 of 1
APPLICATION NO. : 10/140656
DATED : February 26, 2008
INVENTOR(S) : Jaban Shah Fakharzadeh It is certified that error appears in the above-identified patent and that said Letters Patent is hereby corrected as shown below:

In Claim 11, Column 16, Line 13: "trick-node" should be --trick-mode--

Signed and Sealed this

Fourteenth Day of October, 2008

JON W. DUDAS
*Director of the United States Patent and Trademark Office*